(12) United States Patent
Kawasaki et al.

(10) Patent No.: US 11,309,537 B2
(45) Date of Patent: Apr. 19, 2022

(54) PRODUCTION METHOD FOR LITHIUM-ION BATTERY MEMBER

(71) Applicant: APB CORPORATION, Tokyo (JP)

(72) Inventors: Yohji Kawasaki, Kyoto (JP); Yuichiro Yokoyama, Kyoto (JP); Hideaki Horie, Tokyo (JP)

(73) Assignee: APB CORPORATION, Tokyo (JP)

( * ) Notice: Subject to any disclaimer, the term of this patent is extended or adjusted under 35 U.S.C. 154(b) by 0 days.

(21) Appl. No.: 17/286,235

(22) PCT Filed: Mar. 25, 2020

(86) PCT No.: PCT/JP2020/013233
§ 371 (c)(1),
(2) Date: Apr. 16, 2021

(87) PCT Pub. No.: WO2020/196591
PCT Pub. Date: Oct. 1, 2020

(65) Prior Publication Data
US 2021/0313560 A1    Oct. 7, 2021

(30) Foreign Application Priority Data
Mar. 28, 2019  (JP) .............................. JP2019-063389

(51) Int. Cl.
*H01M 4/04*      (2006.01)
*H01M 4/139*     (2010.01)
*H01M 4/36*      (2006.01)
*H01M 4/62*      (2006.01)

(52) U.S. Cl.
CPC ......... *H01M 4/139* (2013.01); *H01M 4/0402* (2013.01); *H01M 4/0435* (2013.01); *H01M 4/366* (2013.01); *H01M 4/625* (2013.01)

(58) Field of Classification Search
CPC .. H01M 4/139; H01M 4/0402; H01M 4/0435; H01M 4/366
See application file for complete search history.

(56) References Cited

U.S. PATENT DOCUMENTS

| | | |
|---|---|---|
| 2016/0233510 A1 | 8/2016 | Onodera et al. |
| 2017/0018779 A1 | 1/2017 | Umeyama et al. |
| 2017/0033350 A1 | 2/2017 | Mizuno et al. |
| 2017/0110728 A1 | 4/2017 | Kobayashi et al. |
| 2020/0028166 A1 | 1/2020 | Tanaka et al. |
| 2020/0136125 A1* | 4/2020 | Suenaga ........... H01M 10/0585 |
| 2021/0151739 A1 | 5/2021 | Nishiguchi et al. |

FOREIGN PATENT DOCUMENTS

| | | |
|---|---|---|
| EP | 3 086 387 | 10/2016 |
| JP | 2000-164217 | 6/2000 |
| JP | 2000-294290 | 10/2000 |
| JP | 2002-260739 | 9/2002 |
| JP | 2010-171366 | 8/2010 |
| JP | 2012-156130 | 8/2012 |
| JP | 2012-243710 | 12/2012 |
| JP | 2013-196956 | 9/2013 |
| JP | 2015-099785 | 5/2015 |
| JP | 2015-115103 | 6/2015 |
| JP | 2017-098235 | 6/2017 |
| JP | 2017-147222 | 8/2017 |
| JP | 2018-45902 | 3/2018 |
| JP | 2018-067508 | 4/2018 |
| WO | 2015/093411 | 6/2015 |
| WO | 2018/055956 | 3/2018 |
| WO | WO 2018/194163 | * 10/2018 |
| WO | 2019/230912 | 12/2019 |

OTHER PUBLICATIONS

International Search Report dated Jun. 30, 2020 in International (PCT) Application No. PCT/JP2020/013233.
Written Opinion of International Searching Authority dated Jun. 30, 2020 in International (PCT) Application No. PCT/JP2020/013233, with English translation.
International Search Report dated Jun. 12, 2018 in International (PCT) Application No. PCT/JP2018/016338.
Notice of Allowance dated Jul. 12, 2021, in U.S. Appl. No. 16/606,858.

* cited by examiner

*Primary Examiner* — Austin Murata
(74) *Attorney, Agent, or Firm* — Wenderoth, Lind & Ponack, L.L.P.

(57) ABSTRACT

The present invention relates to a method of producing a lithium-ion battery member including an electrode composition layer that includes electrode active material particles and an electrolyte solution on a current collector or a separator, the method including: forming the electrode composition layer on a surface of a support different from either the current collector or the separator; and relocating the electrode composition layer from the surface of the support to the current collector or the separator, wherein a weight percent of the electrolyte solution in the electrode composition layer is 10 wt % or less based on the weight of the electrode composition layer, in the forming the electrode composition layer on a surface of a support and in the relocating the electrode composition layer from the surface of the support to the current collector or the separator.

3 Claims, No Drawings

PRODUCTION METHOD FOR LITHIUM-ION BATTERY MEMBER

TECHNICAL FIELD

The present invention relates to a method of producing a lithium-ion battery member.

BACKGROUND ART

Reduction in carbon dioxide emissions has been strongly desired in recent years for environmental protection. In the automotive industry, introduction of electric vehicles (EVs) and hybrid electric vehicles (HEVs) has been expected to reduce carbon dioxide emissions, and secondary batteries for driving motors, which are the key to practical utilization of EVs and HEVs, are being actively developed. As the secondary batteries, lithium-ion batteries capable of providing high energy density and high output power density are attracting attention, and there is a demand for a method of producing a high-performance lithium-ion battery member in a stable and efficient manner.

For example, the lithium-ion battery member can be obtained by forming an electrode material containing an electrode active material or the like into a sheet, and pressure-bonding the sheet to a current collector.

Patent Literature 1 discloses a method of producing a lithium-ion battery member. The method includes forming an electrode composition layer that includes an electrode active material and a binding agent on a surface of a support by a dry method; and either peeling the electrode composition layer from the support and then pressure-bonding the electrode composition layer to a current collector, or pressure-bonding the electrode composition layer to a current collector and then peeling the electrode composition layer from the support.

CITATION LIST

Patent Literature

Patent Literature 1: JP 2010-171366 A

SUMMARY OF INVENTION

Technical Problem

Production of batteries using the lithium-ion battery members obtained by the method disclosed in Patent Literature 1 is disadvantageous in terms of production cost because the production involves impregnation with a large amount of an electrolyte solution, which requires a large amount of time. In addition, the quality of the lithium-ion battery members is unstable.

In order to solve the issues, a wet method is used in the present invention which forms an electrode composition layer with an electrolyte solution contained therein. A finding has also been made on a structure of the electrode composition layer, which can optimize relationships that vary depending on the presence of the electrolyte solution in the electrode composition layer, i.e., peeling strength between the electrode and the support, electrode strength, and peeling strength between the electrode and the current collector.

Solution to Problem

As a result of extensive studies to solve the issues, the present inventors completed the present invention.

Specifically, the present invention relates to a method of producing a lithium-ion battery member including an electrode composition layer that includes electrode active material particles and an electrolyte solution on a current collector or a separator, the method including: forming the electrode composition layer on a surface of a support different from either the current collector or the separator; and relocating the electrode composition layer from the surface of the support to the current collector or the separator, wherein a weight percent of the electrolyte solution in the electrode composition layer is 10 wt % or less based on the weight of the electrode composition layer, in the forming the electrode composition layer on a surface of a support and in the relocating the electrode composition layer from the surface of the support to the current collector or the separator.

Advantageous Effects of Invention

The present invention can provide a method of producing a high-quality lithium-ion battery member in a simple and stable manner.

DESCRIPTION OF EMBODIMENTS

The present invention is described in detail below.

The present invention relates to a method of producing a lithium-ion battery member including an electrode composition layer that includes electrode active material particles and an electrolyte solution on a current collector or a separator, the method including: forming the electrode composition layer on a surface of a support different from either the current collector or the separator; and relocating the electrode composition layer from the surface of the support to the current collector or the separator, wherein a weight percent of the electrolyte solution in the electrode composition layer is 10 wt % or less based on the weight of the electrode composition layer, in the forming the electrode composition layer on a surface of a support and in the relocating the electrode composition layer from the surface of the support to the current collector or the separator.

The lithium-ion battery member obtainable by the production method of the present invention includes an electrode composition layer that includes electrode active material particles and an electrolyte solution on a current collector or a separator.

Such a lithium-ion battery member including the electrode composition layer on the current collector is also referred to as an "electrode for a lithium-ion battery."

Such an electrode in which the electrode active material particles forming the electrode composition layer are positive electrode active material particles is also referred to as a positive electrode for a lithium-ion battery. Such an electrode in which the electrode active material particles forming the electrode composition layer are negative electrode active material particles is also referred to as a negative electrode for a lithium-ion battery.

A lithium-ion battery member including the electrode composition layer between the current collector and the separator is also referred to as an electrode sheet for a lithium-ion battery. Such a sheet in which the electrode active material particles forming the electrode composition layer are positive electrode active material particles is also referred to as a positive electrode sheet for a lithium-ion battery. Such a sheet in which the electrode active material particles forming the electrode composition layer are negative electrode active material particles is also referred to as a negative electrode sheet for a lithium-ion battery.

[Forming Electrode Composition Layer on Surface of Support]

The method of producing a lithium-ion battery member of the present invention includes forming an electrode composition layer that includes electrode active material particles and an electrolyte solution on a surface of a support different from either a separator or a current collector.

The support may be made of any material such as an inorganic material or an organic material that allows the electrode composition layer to be formed on the support. Examples include metal foil such as aluminum foil or copper foil, plastic films, and paper. A multilayer film including a plurality of the films may also be used. Preferred of these are paper and thermoplastic resin films in terms of versatility and handling. In particular, preferred of these paper and thermoplastic resin films are polyethylene terephthalate (PET) films, polyolefin films, polyvinyl alcohol (PVA) films, polyvinyl butyral (PVB) films, and polyvinyl chloride (PVC) films. The support in the present invention is not used as the current collector or the separator.

The method of forming the electrode composition layer on the surface of the support is not limited. For example, in one method, a mixture of electrode active material particles and an electrolyte solution (also referred to as an "electrode composition") and the support are supplied to a pair of substantially horizontally disposed pressing rolls or belts; and the electrode composition is molded into a sheet as an electrode composition layer by the pair of pressing rolls or belts while the electrode composition layer is pressure-bonded to the support.

At this point, the weight percent of the electrolyte solution in the electrode composition may be more than 10 wt % relative to the weight of the electrode composition.

The electrode composition layer includes electrode active material particles and an electrolyte solution. The electrode active material particles are categorized into two types: those for a positive electrode (positive electrode active material particles), and those for a negative electrode (negative electrode active material particles).

Examples of the positive electrode active material particles include complex oxides of lithium and transition metals such as complex oxides containing one transition metal (e.g., $LiCoO_2$, $LiNiO_2$, $LiAlMnO_4$, $LiMnO_2$, and $LiMn_2O_4$), complex oxides containing two transition metal elements (e.g., $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$), and complex oxides containing three or more transition metal elements (e.g., $LiM_aM'_bM''_cO_2$ (M, M', and M'' are each a different transition metal element, and a+b+c=1, e.g., $LiNi_{1/3}Mn_{1/3}Co_{1/3}O_2$)); lithium-containing transition metal phosphates (e.g., $LiFePO_4$, $LiCoPO_4$, $LiMnPO_4$, and $LiNiPO_4$); transition metal oxides (e.g., $MnO_2$ and $V_2O_5$), transition metal sulfides (e.g., $MoS_2$ and $TiS_2$); and conductive polymers (e.g., polyaniline, polypyrrole, polythiophene, polyacetylene, poly-p-phenylene, and polyvinylcarbazole). Two or more thereof may be used in combination.

The lithium-containing transition metal phosphates may be those in which the transition metal site is partially replaced by another transition metal.

The volume average particle size of the positive electrode active material particles is preferably 0.01 to 100 μm, more preferably 0.1 to 35 μm, still more preferably 2 to 30 μm, in terms of electrical characteristics of the battery.

Examples of the negative electrode active material particles include carbon materials (e.g., graphite, non-graphitizable carbon, amorphous carbon, products obtained by firing resin (e.g., products obtained by firing and carbonizing phenolic resin and furan resin), coke (e.g., pitch coke, needle coke, and petroleum coke), and carbon fibers); silicon-based materials (e.g., silicon, silicon oxide (SiOx), silicon-carbon composites (e.g., carbon particles each having a surface coated with silicon and/or silicon carbide, silicon particles or silicon oxide particles each having a surface coated with carbon and/or silicon carbide, and silicon carbide), and silicon alloys (e.g., silicon-aluminum alloy, silicon-lithium alloy, silicon-nickel alloy, silicon-iron alloy, silicon-titanium ally, silicon-manganese alloy, silicon-copper alloy, and silicon-tin alloy); conductive polymers (e.g., polyacetylene and polypyrrole); metals (e.g., tin, aluminum, zirconium, and titanium); metal oxides (e.g., titanium oxide and lithium.titanium oxide); metal alloys (e.g., lithium-tin alloy, lithium-aluminum alloy, and lithium-aluminum-manganese alloy); and mixtures of these materials and a carbon material.

Among these negative electrode active material particles, those not containing lithium or lithium ions inside may be predoped to allow the negative electrode active material particles to partially or entirely contain lithium or lithium ions in advance.

In terms of battery capacity and the like, preferred of these are carbon-based materials, silicon-based materials, and mixtures thereof. More preferred carbon-based materials are graphite, non-graphitizable carbon, and amorphous carbon. More preferred silicon-based materials are silicon oxide and silicon-carbon composites.

The volume average particle size of the negative electrode active material particles is preferably 0.01 to 100 μm, more preferably 0.1 to 20 μm, still more preferably 2 to 10 μm, in terms of electrical characteristics of the battery.

Preferably, the electrode active material particles are coated electrode active material particles each having a surface at least partially coated with a coating layer containing a high molecular weight compound.

Such coated electrode active material particles in which the constituent electrode active material particles are positive electrode active material particles are also referred to as "coated positive electrode active material particles." Such coated electrode active material particles in which the constituent electrode active material particles are negative electrode active material particles are also referred to as "coated negative electrode active material particles."

Examples of the high molecular weight compound include resin for coating a lithium-ion battery active material disclosed in WO 2015/005117 and JP 2017-054703 A. Specific examples include vinyl resin, urethane resin, polyester resin, polyamide resin, epoxy resin, polyimide resin, silicone resin, phenolic resin, melamine resin, urea resin, aniline resin, ionomer resin, polycarbonate, polysaccharide (e.g., sodium alginate), and mixtures thereof. Preferred of these is vinyl resin in terms of wettability with the electrolyte solution and absorption of the electrolyte solution.

Preferably, the vinyl resin contains a polymer (B) containing a vinyl monomer (b) as an essential constituent monomer.

The polymer (B) containing the vinyl monomer (b) as an essential constituent monomer has a moderate swelling degree and high mechanical strength when wet. Thus, coating the active material particles with the polymer (B) can suppress a reduction in strength of the electrode when wet.

Particularly preferred examples of the vinyl monomer (b) are a carboxy group-containing vinyl monomer (b1) and a vinyl monomer (b2) represented by the following formula (1):

$$CH_2=C(R^1)COOR^2 \quad (1)$$

wherein $R^1$ is a hydrogen atom or a methyl group, and $R^2$ is a C4-C36 branched alkyl group.

Examples of the carboxy group-containing vinyl monomer (b1) include C3-C15 monocarboxylic acids such as (meth)acrylic acid, crotonic acid, and cinnamic acid; C4-C24 dicarboxylic acids such as maleic acid and maleic anhydride, fumaric acid, itaconic acid and itaconic anhydride, citraconic acid, and mesaconic acid; and C6-C24 trivalent, tetravalent, or higher polycarboxylic acids such as aconitic acid. Preferred of these is methyl acrylate.

In the vinyl monomer (b2) represented by the formula (1), $R^1$ represents a hydrogen atom or a methyl group. $R^1$ is preferably a methyl group.

$R^2$ is a C4-C36 branched alkyl group. Specific examples of R2 include 1-alkylalkyl groups (e.g., 1-methylpropyl (sec-butyl), 1,1-dimethylethyl (tert-butyl), 1-methylbutyl, 1-ethylpropyl, 1,1-dimethylpropyl, 1-methylpentyl, 1-ethylbutyl, 1-methylhexyl, 1-ethylpentyl, 1-methylheptyl, 1-ethylhexyl, 1-methyloctyl, 1-ethylheptyl, 1-methylnonyl, 1-ethyloctyl, 1-methyldecyl, 1-ethylnonyl, 1-butyleicosyl, 1-hexyloctadecyl, 1-octyihexadecyl, 1-decyltetradecyl, and 1-undecyltridecyl groups); 2-alkylalkyl groups (e.g., 2-methylpropyl (iso-butyl), 2-methylbutyl, 2-ethylpropyl, 2,2-dimethylpropyl, 2-methylpentyl, 2-ethylbutyl, 2-methylhexyl, 2-ethylpentyl, 2-methylheptyl, 2-ethylhexyl, 2-methyloctyl, 2-ethylheptyl, 2-methylnonyl, 2-ethyloctyl, 2-methyldecyl, 2-ethylnonyl, 2-hexyloctadecyl, 2-octyihexadecyl, 2-decyltetradecyl, 2-undecyltridecyl, 2-dodecylhexadecyl, 2-tridecylpentadecyl, 2-decyloctadecyl, 2-tetradecyloctadecyl, 2-hexadecyloctadecyl, 2-tetradecyleicosyl, and 2-hexadecyleicosyl groups); 3 to 34-alkylalkyl groups (e.g., 3-alkylalkyl, 4-alkylalkyl, 5-alkylalkyl, 32-alkylalkyl, 33-alkylalkyl, and 34-alkylalkyl groups); mixed alkyl groups containing one or more branched alkyl groups such as alkyl residues of oxo alcohols corresponding to propylene oligomers (from heptamer to undecamer), ethylene/propylene (molar ratio of 16/1 to 1/11) oligomers, isobutylene oligomers (from heptamer to octamer), and α-olefin (C5-C20) oligomers (from tetramer to octamer).

Preferred of these are 2-alkylalkyl groups, and more preferred are 2-ethylhexyl group and a 2-decyltetradecyl group, in terms of absorption of the electrolyte solution.

The lower limit of the number average molecular weight of the high molecular weight compound is preferably 3,000, more preferably 50,000, particularly preferably 100,000, most preferably 200,000. The upper limit thereof is preferably 2,000,000, more preferably 1,500,000, particularly preferably 1,000,000, most preferably 800,000.

The number average molecular weight of the high molecular weight compound can be measured by gel permeation chromatography (GPC) under the following conditions.
Device: Alliance GPC V2000 (Waters Corporation)
Solvent: ortho-dichlorobenzene
Standard substance: polystyrene
Sample concentration: 3 mg/ml
Column solid phase: PLgel 10 μm, MIXED-B, two columns connected in series (Polymer Laboratories Limited)
Column temperature: 135° C.

The solubility parameter (SP value) of the high molecular weight compound is preferably 9.0 to 20.0 $(cal/cm^3)^{1/2}$. The SP value of the high molecular weight compound is more preferably 9.5 to 18.0 $(cal/cm^3)^{1/2}$, still more preferably 9.5 to 14.0 $(cal/cm^3)^{1/2}$. The high molecular weight compound having an SP value of 9.0 to 20.0 $(cal/cm^3)^{1/2}$ is preferred in terms of absorption of the electrolyte solution.

The SP value $(cal/cm^3)^{1/2}$ in the method of producing a lithium-ion battery member of the present invention is a value calculated at 25° C. by the method described in Polymer Engineering and Science (Robert F. Fedors et al., vol. 14, pp. 151 to 154).

The glass transition point (hereinafter, abbreviated to "Tg"; measurement method: differential scanning calorimetry (DSC)) of the high molecular weight compound is preferably 80° C. to 200° C., more preferably 90° C. to 180° C., particularly preferably 100° C. to 150° C., in terms of heat resistance of the battery.

Preferably, the weight percent of the high molecular weight compound is 1 to 20 wt % based on the weight of the coated electrode active material particles. More preferably, the weight percent is 2 to 7 wt % in terms of moldability and resistance.

The coating layer may contain a conductive additive, if necessary.

Non-limiting examples of the conductive additive include metals (e.g., nickel, aluminum, stainless steel (SUS), silver, gold, copper, and titanium), carbon (e.g., graphite and carbon black (such as acetylene black, ketjen black, furnace black, channel black, and thermal lamp black)), and mixtures thereof.

These conductive additives may be used alone or in combination of two or more thereof. Alternatively, an alloy or metal oxide thereof may be used. In terms of electrical stability, preferred are aluminum, stainless steel, carbon, silver, copper, titanium, and mixtures thereof. More preferred are silver, aluminum, stainless steel, and carbon. Still more preferred is carbon. Alternatively, the conductive additive may be a particulate ceramic material or resin material coated with a conductive material (a metal material among the materials of the conductive additives) by plating or the like.

The average particle size of the conductive additive is not particularly limited, but it is preferably 0.01 to 10 μm, more preferably 0.02 to 5 μm, still more preferably 0.03 to 1 μm, in terms of electrical characteristics of the battery. The term "particle size" as used herein refers to the maximum distance L of all distances between any two points on the contour of each particle of the conductive additive. To determine the value of the average particle size, the particles are observed using a device such as a scanning electron microscope (SEM) or a transmission electron microscope (TEM), and the average particle size of particles observed in several to several tens of viewing fields is calculated.

The shape (form) of the conductive additive is not limited to the particulate form and may be a different form. For example, the conductive material may be a carbon nanotube which has been practically used as a filler-type conductive resin composition.

The conductive additive may be in the form of fibrous-shaped conductive fibers.

Examples of the conductive fiber include carbon fibers such as PAN-based carbon fibers and pitch-based carbon fibers; conductive fibers obtained by uniformly dispersing highly conductive metal or graphite in synthetic fibers; metal fibers obtained by making metal such as stainless steel into fibers; conductive fibers obtained by coating the surface of organic fibers with metal; and conductive fibers obtained by coating the surface of organic fibers with a resin containing a conductive substance. Preferred of these conductive fibers are carbon fibers. Polypropylene resin into which graphene has been kneaded is also preferred.

When the conductive additive is in the form of conductive fibers, the average fiber diameter is preferably 0.1 to 20 μm.

The following describes a method of producing coated electrode active material particles.

The coated electrode active material particles may be produced by, for example, mixing the high molecular weight compound, electrode active material particles, and, optional conductive additive. Alternatively, the coated electrode active material particles may be produced by mixing the high molecular weight compound and conductive additive to prepare a coating material, and mixing the coating material with the electrode active material particles.

The electrode active material particles, high molecular weight compound, and conductive additive may be mixed in any order, but preferably, the electrode active material particles and high molecular weight compound are mixed first, and the conductive additive is then added and mixed.

The surface of each electrode active material particle is at least partially coated with the coating layer containing the high molecular weight compound and optional conductive additive by the above method.

For example, the coated electrode active material particles can be obtained as follows: while the electrode active material particles are stirred at 30 to 500 rpm in a universal mixer, a resin composition solution containing the high molecular weight compound and optional conductive additive is added dropwise thereto over 1 to 90 minutes; the conductive additive is further added if necessary; while the mixture is stirred, the temperature is raised to 50° C. to 200° C., and the pressure is reduced to 0.007 to 0.04 MPa; and the mixture is then kept in this state for 10 to 150 minutes.

The electrode composition layer forming the lithium-ion battery member obtainable by the production method of the present invention includes electrode active material particles and an electrolyte solution.

The electrolyte solution may be a known non-aqueous electrolyte solution containing an electrolyte and a non-aqueous solvent, which is used in lithium-ion battery production.

The electrolyte may be one used in a known non-aqueous electrolyte solution, for example. Preferred examples include inorganic acid lithium salt-based electrolytes, such as $LiPF_6$, $LiBF_4$, $LiSbF_6$, $LiAsF_6$, and $LiClO_4$; fluorine atom-containing sulfonylimide-based electrolytes such as $LiN(FSO_2)_2$, $LiN(CF_3SO_2)_2$, and $LiN(C_2F_5SO_2)_2$; and fluorine atom-containing sulfonylmethide-based electrolytes such as $LiC(CF_3SO_2)_3$. Of these, $LiPF_6$ is more preferred. $LiPF_6$ may be used in combination with other electrolyte(s), but is more preferably used alone.

The concentration of the electrolyte in the non-aqueous electrolyte solution is not limited. Yet, the concentration is preferably 1 to 5 mol/L, more preferably 1.5 to 4 mol/L, still more preferably 2 to 3 mol/L, in terms of handling of the non-aqueous electrolyte solution, battery capacity, and the like.

The non-aqueous solvent may be one that is used in a known electrolyte solution. Examples include lactone compounds, cyclic or acyclic carbonate esters, acyclic carboxylate esters, cyclic or acyclic ethers, phosphate esters, nitrile compounds, amide compounds, sulfone, and mixtures thereof.

Examples of the lactone compounds include 5-membered lactone compounds (e.g., γ-butyrolactone and γ-valerolactone) and 6-membered lactone compounds (e.g., δ-valerolactone).

Examples of the cyclic carbonate esters include propylene carbonate, ethylene carbonate, and butylene carbonate.

Examples of the acyclic carbonate esters include dimethyl carbonate, methyl ethyl carbonate, diethyl carbonate, methyl-n-propyl carbonate, ethyl-n-propyl carbonate, and di-n-propyl carbonate.

Examples of the acyclic carbonate esters include methyl acetate, ethyl acetate, propyl acetate, and methyl propionate.

Examples of the cyclic ethers include tetrahydrofuran, tetrahydropyran, 1,3-dioxolan, and 1,4-dioxane.

Examples of the acyclic ethers include dimethoxymethane and 1,2-dimethoxyethane.

Examples of the phosphate esters include trimethyl phosphate, triethyl phosphate, ethyl dimethyl phosphate, diethyl methyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholan-2-one, 2-trifluoroethoxy-1,3,2-dioxaphospholan-2-one, and 2-methosyethoxy-1,3,2-dioxaphospholan-2-one.

Examples of the nitrile compounds include acetonitrile.

Examples of the amide compounds include N,N-dimethylformamide (hereinafter described as "DMF").

Examples of the sulfone include acyclic sulfones such as dimethyl sulfone and diethyl sulfone and cyclic sulfones such as sulfolane.

These non-aqueous solvents may be used alone or in combination of two or more thereof.

Preferred of these non-aqueous solvents are lactone compounds, cyclic carbonate esters, acyclic carbonate esters, and phosphate esters, in view of output and charge/discharge cycle characteristics of the battery. Preferably, nitrile compounds are not used. More preferred are lactone compounds, cyclic carbonate esters, and acyclic carbonate esters. Particularly preferred are a mixture of ethylene carbonate (EC) and dimethyl carbonate (DMC) and a mixture of ethylene carbonate (EC) and propylene carbonate (PC).

The electrode composition layer may contain a conductive additive, if necessary. Examples of the conductive additive are as described above. The weight percent of the conductive additive in the electrode composition layer, including the conductive additive in the coating layer of each coated electrode active material particle, is preferably 0.1 to 12 wt %, more preferably 0.5 to 10 wt %, particularly preferably 1.0 to 8.0 wt %, based on the weight of the electrode composition layer. When the weight percent of the conductive additive in the electrode composition layer is in the above ranges, the resulting battery has good electrical characteristics.

Preferably, the amount of an electrode binder (also simply referred to as a "binding agent" or a "binder") in the electrode composition layer is 1 wt % or less based on the weight of the electrode composition layer. More preferably, the electrode composition layer contains substantially no electrode binder. Still more preferably, the electrode composition layer contains a viscous adhesive resin.

Examples of the electrode binder include starch, polyvinylidene fluoride, polyvinyl alcohol, carboxymethyl cellulose, polyvinylpyrrolidone, tetrafluoroethylene, polyethylene, polypropylene, and styrene-butadiene copolymers. These electrode binders are known as binding agents for known lithium-ion batteries, which are used to bond and fix electrode active material particles together and to bond and fix electrode active material particles to a current collector. These electrode binders are dissolved or dispersed in a solvent for use. The solvent is volatilized and distilled off to precipitate a solid, whereby the electrode binders form bonds between the electrode active material particles and between the electrode active material particles and the current collector.

When the electrode composition contains the binder, a drying step is required after the electrode composition layer is formed so as to integrate the electrode composition layer. When the electrode composition contains a viscous adhesive resin, the electrode composition layer can be integrated when a slight pressure is applied at room temperature, without requiring the drying step. When the drying step is not performed, the electrode composition layer is advantageously not subjected to heat-induced shrinkage or cracking.

In addition, even after the electrode composition containing the electrode active material, electrolyte solution, and viscous adhesive resin is formed into an electrode composition layer, the electrode composition layer remains in the form of an unbound product. When the electrode composition layer is an unbound product, the electrode composition layer can be made thick, advantageously resulting in a high capacity battery.

Examples of the viscous adhesive resin include one obtained by mixing a high molecular weight compound forming the coating layer of each coated electrode active material particle with a small amount of organic solvent and adjusting the glass-transition temperature to room temperature (25° C.) or lower, and one disclosed as an adhesive in JP H10-255805 A and the like.

The term "unbound product" herein means that the electrode active material particles forming the electrode composition are not bonded together. The term "bonded" means that the electrode active material particles are irreversibly fixed together. The binder becomes dry and solid when its solvent component is volatilized, and strongly bonds and fixes the electrode active material particles together. The viscous adhesive resin does not become solid even when its solvent component is volatilized to dry the viscous adhesive resin, and has adhesion (properties to form a bond when a slight pressure is applied, without using water, solvent, heat, or the like). Thus, the binder and the viscous adhesive resin are different materials.

The lithium-ion battery member obtainable by the production method of the present invention includes the electrode composition layer on the current collector or the separator.

Any material may be used to form the current collector. For example, a known metal current collector and a known resin current collector made of a conductive material and resin (disclosed in JP 2012-150905 A and the like) can be suitably used. The resin current collector is more preferred in terms of output density of the resulting battery.

The metal current collector may be, for example, one or more metal materials selected from the group consisting of copper, aluminum, titanium, nickel, tantalum, niobium, hafnium, zirconium, zinc, tungsten, bismuth, antimony, an alloy containing at least one of these metals, and a stainless steel alloy. Each of these metal materials may be used in the form of a thin sheet, metal foil, or the like. Alternatively, the metal current collector may be the one containing a substrate made of a material other than the above metal materials and a layer of the above metal material on the surface of the substrate formed by a method such as sputtering, electrodeposition, or application.

The conductive material of the conductive additive described above can be suitably used to form the resin current collector.

Examples of the resin forming the resin current collector include polyethylene (PE), polypropylene (PP), polymethylpentene (PMP), polycycloolefin (PCO), polyethylene terephthalate (PET), polyether nitrile (PEN), polytetrafluoroethylene (PTFE), styrene butadiene rubber (SBR), polyacrylonitrile (PAN), polymethyl acrylate (PMA), polymethylmethacrylate (PMMA), polyvinylidene fluoride (PVdF), epoxy resin, silicone resin, and mixtures thereof.

In terms of electrical stability, preferred are polyethylene (PE), polypropylene (PP), polymethylpentene (PMP), and polycycloolefin (PCO); and more preferred are polyethylene (PE), polypropylene (PP), and polymethylpentene (PMP).

Examples of the separator include known separators for lithium-ion batteries, such as polyethylene or polypropylene microporous films, multilayer films composed of a porous polyethylene film and a porous polypropylene film, nonwoven fabrics containing synthetic fibers (e.g., polyester fibers and aramid fibers), glass fibers, or the like, and separators including ceramic microparticles such as silica, alumina, or titania particles attached to the surface of any of these films or nonwoven fabrics.

[Relocating Electrode Composition Layer]

The method of producing a lithium-ion battery member of the present invention includes relocating the electrode composition layer from the surface of the support to the current collector or the separator. The method of relocating the electrode composition layer from the surface of the support to the current collector or the separator is not limited. Examples of the method include one in which the electrode composition layer is peeled from the surface of the support, and the peeled electrode composition layer is then placed on the current collector or the separator; and one in which an electrode composition layer with a support is pressure-bonded to the current collector or the separator, and the current collector with the electrode composition layer or the separator with the electrode composition layer is then peeled from the support.

Preferably, the relocating the electrode composition layer from the surface of the support to the current collector or the separator includes peeling the electrode composition layer from the support and placing the electrode composition layer on the current collector or the separator. Specifically, the peeling the electrode composition layer from the support may be performed first, followed by placing the peeled electrode composition layer on the current collector or the separator; or placing an electrode composition layer with a support on the current collector or the separator may be performed first, followed by the peeling the electrode composition layer from the support. Alternatively, the peeling the electrode composition layer from the support and the placing the electrode composition layer on the current collector or the separator may be performed simultaneously on a roll pressing machine.

Preferably, the relocating the electrode composition layer from the surface of the support to the current collector or the separator includes compressing the electrode composition layer on the current collector or the separator.

When the relocating the electrode composition layer from the surface of the support to the current collector or the separator includes peeling the electrode composition layer from the support and placing the electrode composition layer on the current collector or the separator, the compressing the electrode composition layer on the current collector or the separator is performed after or simultaneously with the placing the electrode composition layer on the current collector or the separator.

Compressing the electrode composition layer on the current collector or the separator increases the adhesion between the current collector or the separator and the electrode composition layer, and reduces the internal resistance of the battery.

A weight percent of the electrolyte solution in the electrode composition layer is 10 wt % or less based on the weight of the electrode composition layer, in the forming the electrode composition layer on a surface of a support and in the relocating the electrode composition layer to the current collector or the separator. When the weight percent of the electrolyte solution in the electrode composition layer is more than 10 wt % based on the weight of the electrode composition layer, the resulting electrode composition layer has insufficient strength and is broken during roll pressing.

The weight percent of the electrolyte solution in the electrode composition layer is preferably 0.5 to 5 wt %, more preferably 1 to 2 wt %, based on the weight of the electrode composition layer, in the forming the electrode composition layer on a support and in the relocating the electrode composition layer to the current collector or the separator.

EXAMPLES

The present invention will be specifically described below with reference to examples, but the present invention is not limited to the examples, and various modifications may be made without departing from the scope of the present invention. The "part(s)" and "%" refer to part(s) by weight and wt %, respectively, unless otherwise specified.

Production of Coating Resin Solution

A four-necked flask equipped with a stirrer, a thermometer, a reflux condenser, a dropping funnel, and a nitrogen gas inlet tube was charged with ethyl acetate (83 parts) and methanol (17 parts), and the temperature was raised to 68° C.

Subsequently, a monomer mixture containing methacrylic acid (242.8 parts), methyl methacrylate (97.1 parts), 2-ethylhexyl methacrylate (242.8 parts), ethyl acetate (52.1 parts), and methanol (10.7 parts), and an initiator solution containing 2,2'-azobis(2,4-dimethylvaleronitrile) (0.263 parts) dissolved in ethyl acetate (34.2 parts) were continuously added dropwise through the dropping funnel over four hours under stirring, while blowing nitrogen into the four-necked flask, to carry out radical polymerization. After the completion of the dropwise addition, an initiator solution containing 2,2'-azobis(2,4-dimethylvaleronitrile) (0.583 parts) dissolved in ethyl acetate (26 parts) was continuously added over two hours through the dropping funnel. The polymerization was further continued at the boiling point for four hours. After the solvent was removed and a resin (582 parts) was obtained, isopropanol (1,360 parts) was added, whereby a coating resin solution containing vinyl resin and having a resin concentration of 30 wt % was obtained.

Production of Coated Positive Electrode Active Material Particles

A $LiNi_{0.8}Co_{0.15}Al_{0.05}O_2$ powder (94 parts) was fed into a universal mixer. While stirring at 150 rpm at room temperature (25° C.), the coating resin solution (resin solids concentration: 30% by mass) was added dropwise over 60 minutes to give a resin solids content of 3 parts, followed by stirring for additional 30 minutes.

Subsequently, while stirring, acetylene black (Denka Black® available from Denka Company Limited); average particle size (primary particle size): 0.036 μm; 3 parts) was added in three portions. The temperature was raised to 70° C. while stirring for 30 minutes, and the pressure was reduced to 100 mmHg. The mixture was kept in this state for 30 minutes. Thus, coated positive electrode active material particles were obtained. The average particle size of the $LiNi_{0.8}Co_{0.15}Al_{0.05}O_2$ powder was 8 μm. The weight percent of the coating resin relative to the coated positive electrode active material particles was 3 wt %.

Production of Coated Negative Electrode Active Material Particles

Non-graphitizable carbon (CARBOTRON® PS (F) available from Kureha Battery Materials Japan Co., Ltd., 88 parts) was fed into a universal mixer. While stirring at 150 rpm at room temperature (25° C.), the coating resin solution (resin solids concentration: 30 wt %) was added dropwise over 60 minutes to give a resin solids content of 6 parts, followed by stirring for additional 30 minutes.

Subsequently, while stirring, acetylene black (Denka Black® available from Denka Company Limited; average particle size (primary particle size): 0.036 μm; 6 parts) was added in three portions. While stirring for 30 minutes, the temperature was raised to 70° C. and the pressure was reduced to 0.01 MPa. The mixture was kept in this state for 30 minutes. Thus, coated negative electrode active material particles were obtained. The average particle size of the non-graphitizable carbon powder was 9 μm, and the weight percent of the coating resin relative to the coated negative electrode active material particles was 6 wt %.

Preparation of Electrolyte Solution $LiPF_6$ was dissolved in a mixed solvent of ethylene carbonate (EC) and propylene carbonate (PC) (volume ratio 1:1) to obtain an electrolyte solution of 1 mol/L.

Production Example 1: Production of Resin Current Collector for Positive Electrode In a twin-screw extruder, polypropylene (PP) (trade name "SunAllomer PC630S" available from SunAllomer Ltd., 69.7 parts), acetylene black (Denka Black® available from Denka Company Limited, 25.0 parts), and a dispersant (trade name "Youmex 1001 (acid-modified polypropylene)" available from Sanyo Chemical Industries, Ltd., 5.0 parts) were melt-kneaded at 100 rpm at 180° C. with a residence time of 5 minutes. Thus, a material for a resin current collector for a positive electrode was obtained. The resulting material for a resin current collector for a positive electrode was passed through a T-die film extruder, and then rolled multiple times by a heat press machine. Thus, a 42-μm thick resin current collector for a positive electrode was obtained.

Production Example 2: Production of Resin Current Collector for Negative Electrode In a twin-screw extruder, polypropylene (trade name "SunAllomer PL500A" available from SunAllomer Ltd., 70 parts), nickel particles (available from Vale, 25 parts), and a dispersant (trade name "Youmex 1001" available from Sanyo Chemical Industries, Ltd., 5 parts) were melt-kneaded at 200 rpm at 200° C. Thus, a material for a resin current collector for a negative electrode was obtained. The resulting material for a resin current collector for a negative electrode was passed through a T-die film extruder, and then rolled multiple times by a heat press machine. Thus, a 45-μm thick resin current collector sheet for a negative electrode was obtained.

A 5-nm thick metal layer made of copper was formed by the vacuum deposition method on each main surface of the resin current collector sheet for a negative electrode. Thus, a resin current collector for a negative electrode with metal layers on both sides of the resin current collector was obtained.

Example 1

The coated positive electrode active material particles (100 parts) and carbon fiber (DONACARBO MILLED S-243 available from Osaka Gas Chemicals; average fiber length: 500 μm; average fiber diameter: 13 μm; conductivity: 200 mS/cm; 6 parts) were dry blended, whereby a positive electrode material mixture was obtained. Subsequently, an electrolyte solution (11 parts) was added to the positive electrode material mixture, followed by mixing in a mixer, whereby a positive electrode composition was obtained. The resulting positive electrode composition was placed at a density of 60 mg/cm$^2$ on a support (SP-8E, made of PE, available from Nihon Label; thickness: 100 μm), and was pressure-molded by a roll pressing machine under a linear pressure of 12.7 kN/cm, whereby a positive electrode composition layer was molded on the support. At this point, the thickness of the positive electrode composition layer was 232 μm.

The resin current collector for a positive electrode was placed on a free interface of the resulting positive electrode composition layer, followed by compression by a roll pressing machine to cause adhesion between the positive electrode composition layer and the resin current collector for a positive electrode.

Subsequently, the support was peeled off, whereby a lithium-ion battery member as a positive electrode for a lithium-ion battery was obtained. No chips or cracks were observed in the appearance of the resulting positive electrode composition layer.

The weight percent of the electrolyte solution in the positive electrode composition layer was 9.4 wt % based on the weight of the positive electrode composition layer, in the forming of the positive electrode composition layer on a support and in the relocating the positive electrode composition layer to the resin current collector for a positive electrode. The weight percent of the conductive additive in the positive electrode composition layer was 7.7 wt % based on the weight of the positive electrode composition layer.

Example 2

The coated negative electrode active material particles (100 parts) and carbon fibers (DONACARBO MILLED S-243 available from Osaka Gas Chemicals; average fiber length: 500 μm; average fiber diameter: 13 μm; conductivity: 200 mS/cm; 1 part) were dry blended, whereby a negative electrode material mixture was obtained. Subsequently, an electrolyte solution (0.11 parts) was added to the negative electrode material mixture, followed by mixing in a mixer, whereby a negative electrode composition was obtained. Subsequently, a negative electrode composition layer was molded on a support as in Example 1, except that the resin current collector for a negative electrode was used as the current collector, and the negative electrode composition layer was transferred to the resin current collector for a negative electrode. Thus, a lithium-ion battery member as a negative electrode for a lithium-ion battery was obtained. The thickness of the negative electrode composition layer when molded on the support was 321 μm. No chips or cracks were observed in the appearance of the resulting negative electrode composition layer.

The weight percent of the electrolyte solution in the negative electrode composition layer was 0.1 wt % based on the weight of the negative electrode composition layer, in the forming of the negative electrode composition layer on a support and in the relocating the negative electrode composition layer to the resin current collector for a negative electrode. The weight percent of the conductive additive in the negative electrode composition layer was 6.9 wt % based on the weight of the negative electrode composition layer.

Comparative Example 1

A positive electrode composition layer was molded on a support as in Example 1, except that the amount of the electrolyte solution was changed to 14.5 parts. The electrolyte solution was squeezed and leaked out from the positive electrode composition during roll pressing. Subsequently, an attempt was made to transfer the positive electrode composition layer to the resin current collector for a positive electrode. When the support was peeled off, a portion of the positive electrode composition layer remained attached to the support. Chips and cracks were observed in the positive electrode composition layer on the resin current collector for a positive electrode.

The weight percent of the electrolyte solution in the electrode composition layer was 12.0 wt % based on the weight of the electrode composition layer, in the forming of the positive electrode composition layer on a support and in the relocating the positive electrode composition layer to the resin current collector for a positive electrode. The weight percent of the conductive additive in the positive electrode composition layer was 7.5 wt % based on the weight of the positive electrode composition layer.

INDUSTRIAL APPLICABILITY

The lithium-ion battery member of the present invention is useful as a member for bipolar secondary batteries and lithium-ion secondary batteries, particularly for mobile phones, personal computers, hybrid vehicles, and electric vehicles.

The invention claimed is:

1. A method of producing a lithium-ion battery member including an electrode composition layer that includes electrode active material particles and an electrolyte solution on a current collector or a separator, the method comprising:
forming the electrode composition layer on a surface of a support different from either the current collector or the separator by pressure-molding by a roll pressing machine; and
relocating the electrode composition layer from the surface of the support to the current collector or the separator by compressing the electrode composition layer on the current collector or the separator by a roll pressing machine to obtain a laminate of the support, the electrode composition layer, and the current collector or the separator, and by peeling the support from the electrode composition layer with the current collector or the electrode composition layer with the separator, wherein a weight percent of the electrolyte solution in the electrode composition layer is 10 wt % or less based on the weight of the electrode composition layer, in the forming the electrode composition layer on a surface of a support and in the relocating the electrode composition layer from the surface of the support to the current collector or the separator.

2. The method of producing a lithium-ion battery member according to claim 1, wherein the electrode active material particles are coated electrode active material particles each having a surface at least partially coated with a coating layer containing a high molecular weight compound, and a weight percent of the high molecular weight compound is 1 to 20 wt % based on the weight of the coated electrode active material particles.

3. The method of producing a lithium-ion battery member according to claim 1, wherein the electrode composition layer contains a conductive additive, and a weight percent of the conductive additive in the electrode composition layer is 0.1 to 12 wt % based on the weight of the electrode composition layer.

* * * * *